Figure 1:
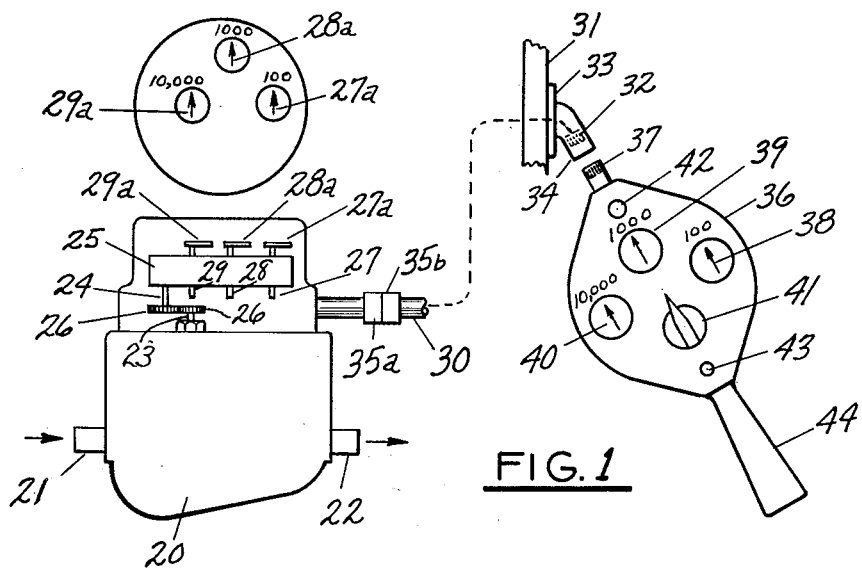

Dec. 18, 1962 H. F. RONDEAU ETAL 3,069,670
REMOTE METER READING SYSTEM
Filed March 22, 1960 4 Sheets-Sheet 1

Herbert J. Rondeau
Leslie B. Weaver
INVENTOR.

BY Ralph Hammar
Attorney

Dec. 18, 1962  H. F. RONDEAU ETAL  3,069,670
REMOTE METER READING SYSTEM
Filed March 22, 1960  4 Sheets-Sheet 2
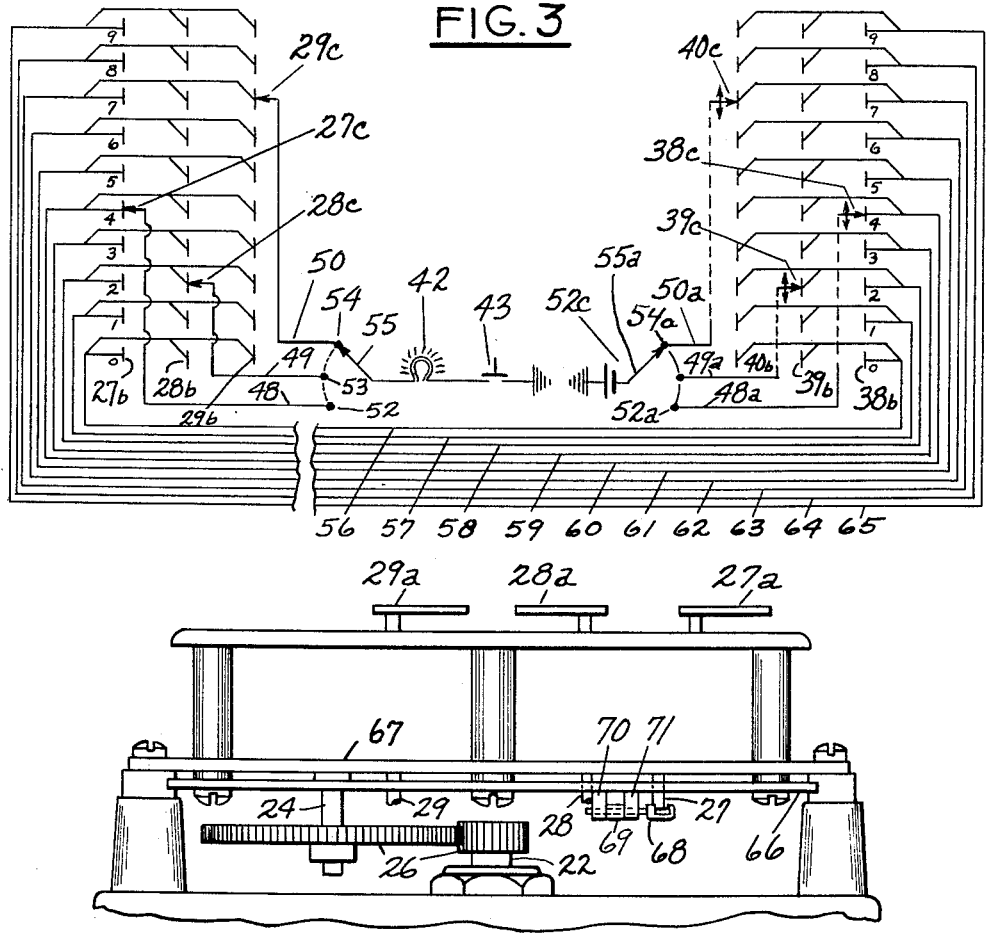
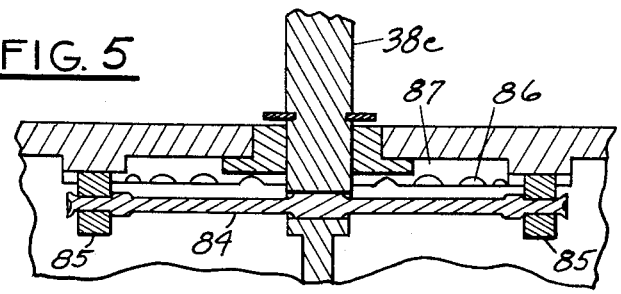
Herbert F. Rondeau
Leslie B. Weaver
INVENTORS
BY Ralph Hammar
Attorney

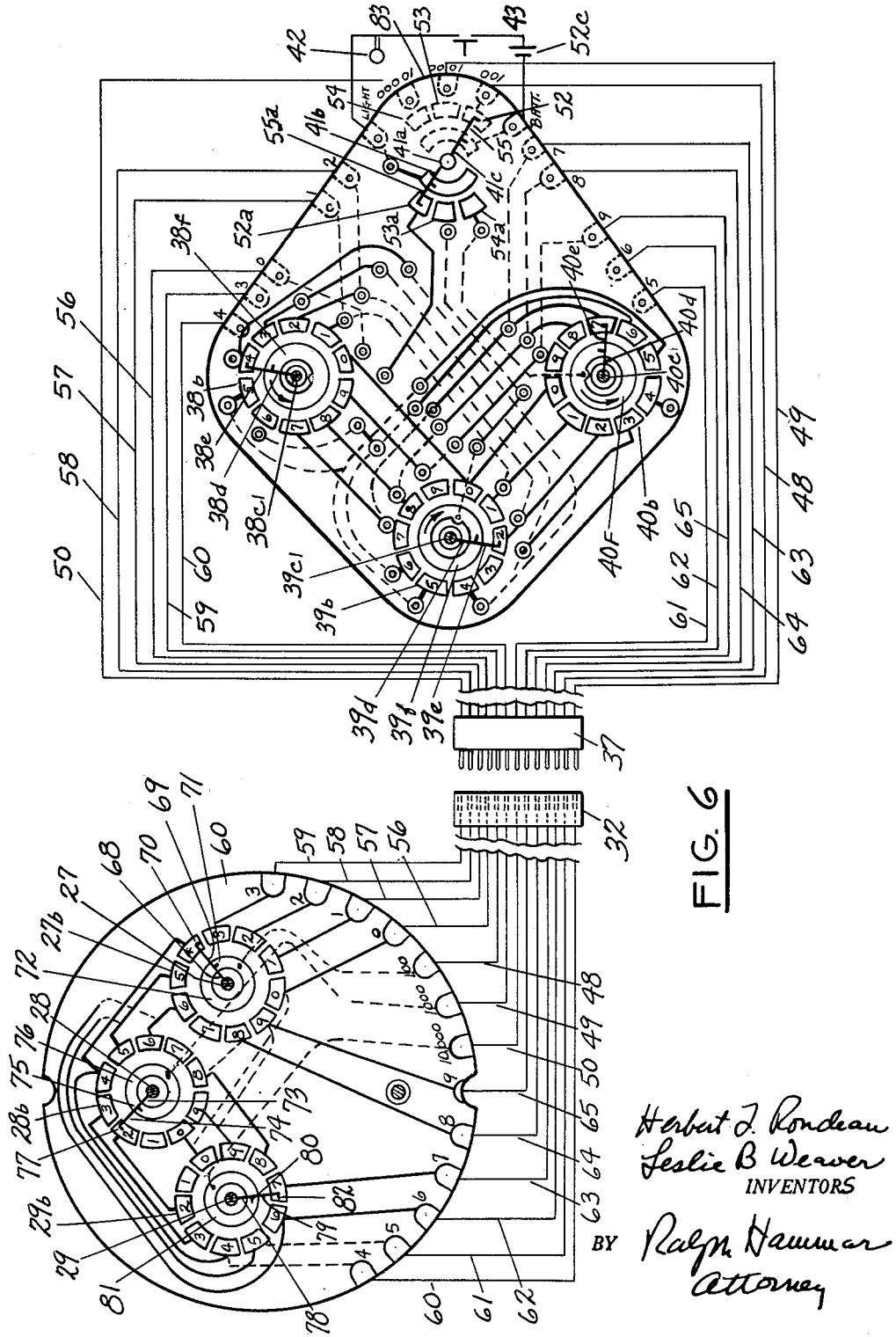

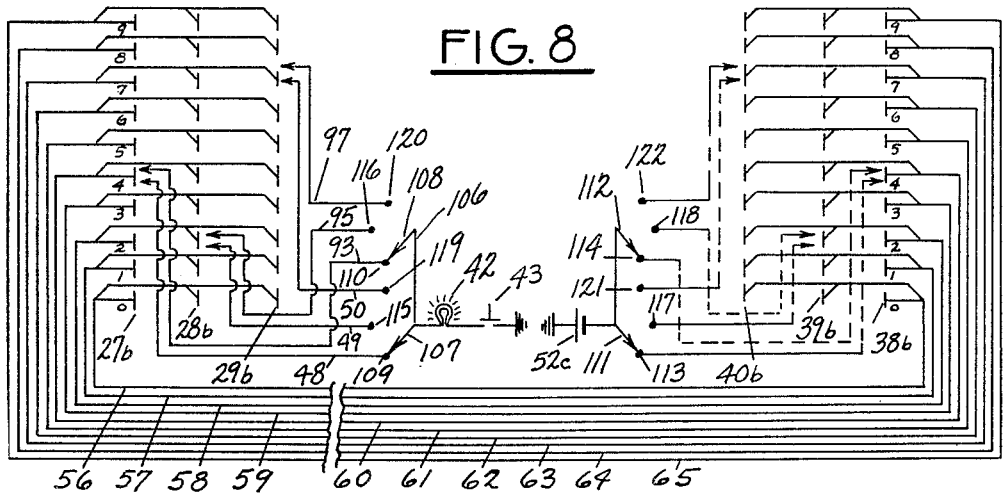
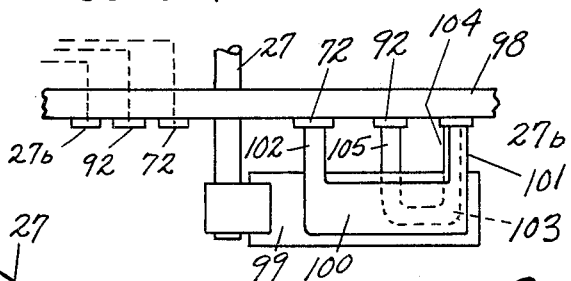
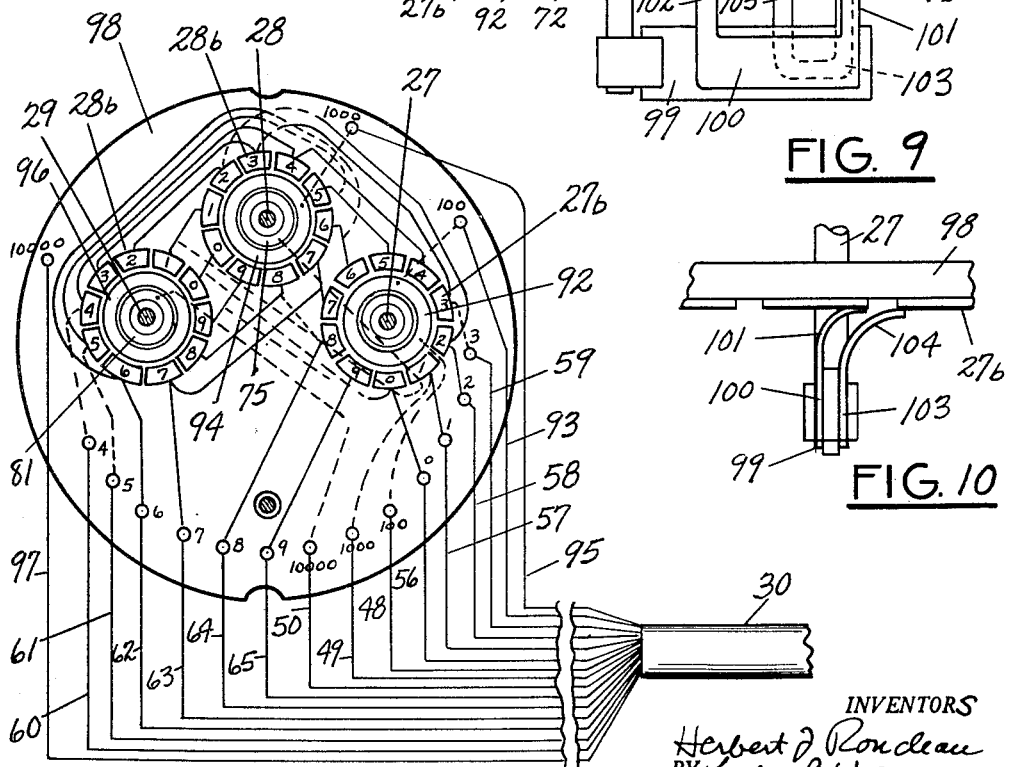

United States Patent Office 3,069,670
Patented Dec. 18, 1962

3,069,670
REMOTE METER READING SYSTEM
Herbert F. Rondeau, Richboro, and Leslie B. Weaver, Bryn Athyn, Pa., assignors to American Meter Company, Incorporated, Philadelphia, Pa., a corporation of Delaware
Filed Mar. 22, 1960, Ser. No. 16,849
1 Claim. (Cl. 340—188)

This invention is a remote meter reading system for gas or water meters and the like in which the meter reader carries a read-out device which is plugged into a connector on the outside of the building or other convenient location at each installation at which a meter reading is to be taken. The meter reading is based upon the principle of matching the position of brushes on commutators respectively in the meters and in the meter read-out device. This can be done to a high degree of accuracy with simple equipment. A single flashlight cell carried in the read-out device provides ample power for many meter readings.

In a preferred form, there is in each meter register a commutator associated with each order of digits to be read and the commutators in the meter registers are connected in parallel through a cable to one part of a plug connector which may be installed in a weatherproof housing on the outside of the building or other location convenient to the meter reader. The meter register remains in place on the meter and continues to provide the usual visual indication of the flow so the accuracy of the remote read-out may be checked at any time. As the pointer for each order of digits of the register turns, it moves a brush over the commutator associated with that order of digits so that the positions of the brushes on the commutators for the respective orders of digits are the same as the corresponding visual indications of the digits on the register. Each commutator brush is likewise connected through the cable to the plug connector.

The read-out device carried by the meter reader has a commutator corresponding to each order of digits to be read and an associated knob which moves a brush over the commutator. The positions of the brushes on the respective commutators of the read-out device correspond to the positions of the associated knobs and are indicated on dials similar to the meter register dials surrounding each knob. The commutators of the read-out device are connected to a connector which may be plugged into the connector at any meter installation. When the read-out connector is plugged in, it connects the brushes of the commutators at the meter through a digit selector switch in the read-out device and an indicator.

In making a meter reading, the meter reader plugs the connector of the read-out device into the connector at the meter installation and thereby establishes a connection between the commutators in the meter and the commutators in the read-out device. By turning the digit selector switch, the brushes on the meter and read-out device commutators for the selected order of digits are connected in series with an indicator and a battery. An indication will be obtained when the knob for the selected digit is turned so that its brush occupies the same position on the meter read-out commutator as the corresponding brush on the meter commutator. In this position, the digit indicated on the dial surrounding each knob will be that indicated by the corresponding pointer on the meter register.

Figure 2:
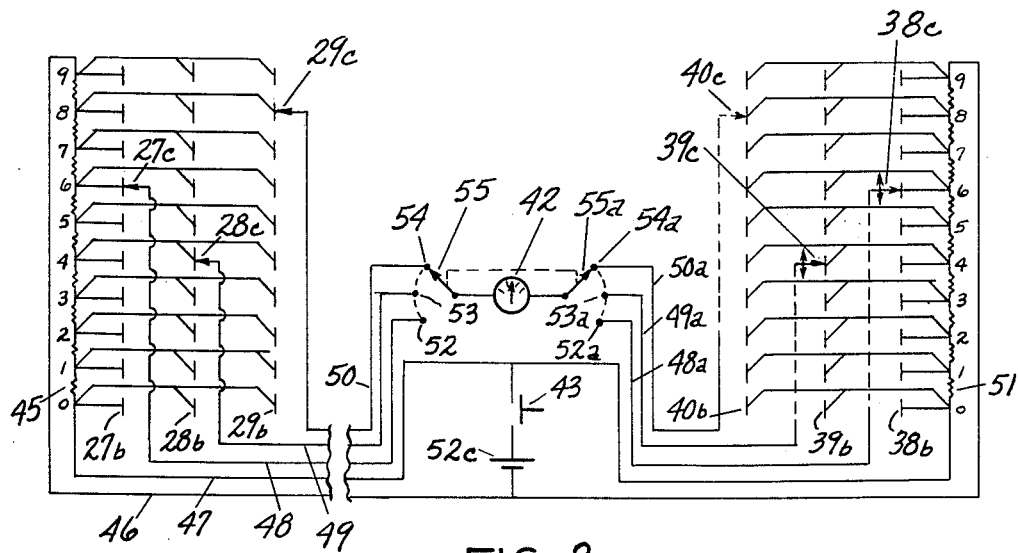
Figure 7:
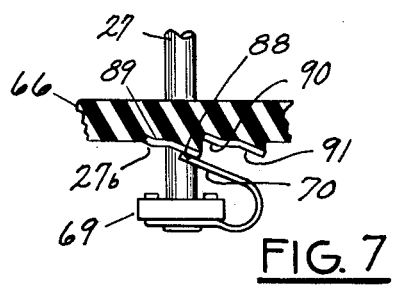

In the drawings, FIG. 1 is a diagrammatic view of a meter installation and the associated read-out device for remote indication, FIG. 2 is a circuit diagram of one arrangement for conducting the meter register information from the register to the read-out device, FIG. 3 is a circuit diagram of another arrangement for conducting the meter register information to the read-out device, FIG. 4 is a detail of the mounting of the printed wiring board within the meter housing, FIG. 5 is a detail of one of the digit selector switches in the meter read-out device, FIG. 6 is a circuit diagram of the printed wiring boards in the meter and in the read-out device, FIG. 7 is a section through a brush and commutator construction in which the brush is moved from segment to segment with a snap action so the brush can never bridge two commutator segments, FIG. 8 is a circuit diagram of another arrangement in which ambiguity is avoided even though a brush should bridge two commutator segments, FIG. 9 is a section through one of the commutators showing the brush, FIG. 10 is an end view of the brush, and FIG. 11 is a layout of the printed wiring board and cable for the meter.

In the meter installation drawing, FIG. 1, there is shown a water meter 20 with an input 21 and an output 22 for connection in the water service line. The water meter is in a frost free location, for example in the basement of the building served. The water meter output shaft 23 drives the input shaft 24 of the meter register 25 through change gears 26. Within the meter register is the usual gearing (not shown) driving register shafts 27, 28, 29 respectively carrying pointers 27a, 28a, 29a which may, for example, indicate hundreds, thousands, and ten thousands of gallons of water flowing through the meter. All the parts so far described are or may be of common construction and may differ substantially from the construction diagrammatically illustrated.

Leading from the meter casing is a multiple conductor cable 30 which extends through the building wall 31 into a connector 32 in a fitting or housing 33 attached to the outside of the building wall and having a downwardly inclined nozzle or spout 34. For ease of installation, the meter will ordinarily have a short length of the cable 30 terminating in one half 35a of a connector. Because the meter may be located at different distances from the outside wall, the installer has assorted lengths of cable 30 fixed at one end to the coupling 32 and at the other end to a coupling 35b mating with the coupling 35a. To make the installation, the installer drills a hole through the outside wall of the house of diameter sufficient to permit the passage of the coupling 35b and the cable 30. After inserting the coupling 35b and cable 30 through the drilled hole in the wall 31, the housing 33 is attached to the outside of the building in a weatherproof manner leaving the connector 32 accessible through the open end of the spout 34. The installation is completed by engaging the coupling 35a with the coupling 35b and sealing the coupling with a tamper proof seal.

Each meter equipped for remote reading retains its register and can be read inside the building in the usual manner. The information of the meter register can, however, be determined from the outside of the building by a remote reading device 36 having a plug-in connector 37 which can be plugged into any connector 32. On the read-out device are knobs 38, 39, 40 which may be turned to indicate any of the digits from 0 to 9 on a dial surrounding each knob. The knobs 38, 39, 40 correspond respectively to the pointers 27a, 28a, 29a and can be set to indicate on the read-out device the same orders of digits indicated by the pointers 27a, 28a, 29a at the meter. The read-out device also carries a selector switch 41 which can be turned to connect an indicator 42 in circuit with parts within the housing controlled by any one of the knobs 38, 39, 40. To determine the digit indicated by one of the pointers 27a, 28a, 29a at the meter, the meter reader turns the selector switch 41 to point to the corresponding knob 38, 39, 40 and pushes a button 43 to close a switch connecting a battery carried in the handle 44 in series with the indicator 42 (e.g. an ammeter) and rotates the knob until an indication is obtained. An indication is given by the indicator 42 only when the position of the knob to which the selector switch 41 points coincides with the digit on the corresponding meter dial.

The indication at the remote read-out device 36 is obtained by the comparison of the position of brushes on commutators at the meter with the position of brushes of identical commutators at the read-out device. There is at the meter a commutator with ten segments for each order of digits in the register and the register pointers turn brushes on the respective commutators so that the brushes occupy the same position with respect to the commutator segments as the register pointers occupy with respect to the meter dials. At the read-out device there are also three commutators with ten segments each and the turning of the knobs 38, 39, 40 moves brushes on these commutators to positions corresponding to the digits. When the brushes on the commutator at the read-out device are in the same positions as the brushes on the commutators at the meter, an indication is obtained by the indicator 42.

In the wiring diagram of FIG. 2, the segments of the commutators associated respectively with the pointers 27a, 28a, 29a at the meter have been indicated as vertical rows of ten segments each and designated by the reference numerals 27b, 28b, 29b. In each of the rows, each segment corresponds to the designated digit and the segments for each digit are connected in parallel. Between adjacent of the parallel connected segments is a resistor 45 and all of the resistors are connected in series with conductors 46, 47. The multiple conductor cable 30 leading from the meter to the connector 32 for the read-out device comprises conductors 46, 47 and conductors 48, 49, 50 respectively connected to brushes 27c, 28c, 29c which are moved over the commutator segments 27b, 28b, 29b by the meter register shafts 27, 28, 29. At the meter read-out device the commutator segments associated with the knobs 38, 39, 40 are indicated as vertical rows of ten segments each designated by the numerals 38b, 39b 40b, respectively, and each segment corresponding to the indicated digit. The segments for each digit are connected in parallel and between adjacent segments are connected resistors 51 identical with the resistors 45, with the resistors being connected in series through the conductors 46, 47 through the push-button switch 43. The conductors 48, 49, 50 are respectively connected to contacts 52, 53, 54 of contact arm 55 of the digit selector switch 41. Conductors 48a, 49a, 50a are respectively connected to the brushes 38c, 39c, 40c and contacts 52a, 53a, 54a on the on the selector switch 41. The indicator 42 is connected between the selector switch contact arm 55 and the selector switch contact arm 55a. The selector switch contact arms 55 and 55a move in unison and in each position connect one of the contacts 52, 53, 54 with the contact of the same number with the subscript "a."

The selector switch is shown in the position to sense the position of the pointer 29c in the meter register. At the left of FIG. 2 it will be seen that the brush 29c moved by the pointer 29 rests on the commutator segment corresponding to the digit 8. When the meter reader turns the knob 40 in the read-out device 36 so that the brush 40c moved by its rests on the digit 8 in the row of commutator segments 40b, a null reading will be obtained at the indicator 42. The reason for this is that the series connected resistances 45 and 51 are connected as a Wheatstone bridge which is in balance only when the brush 40c rests on the same digit as the brush 29c. To sense the other digits at the meter dial, the operation is repeated with the selector switch moved to connect the contacts 53, 53a and the contacts 52, 52a. The sensing is effected successively for each order of digits in the meter register. The sensing operation is performed by the comparison of the position of brushes on identical commutators respectively at the meter and at the read-out device. The power required to indicate coincidence of the brush positions is only that required to actuate the indicator 42 and is, therefore, at such a small level that it can be supplied by a single flashlight cell. This keeps the voltage in the wiring at levels low enough to prevent sparking. The knobs 38, 39, 40 are turned manually to the position of coincidence so that no power is required to turn the knobs.

The circuit diagram of FIG. 3 uses the same commutator segments 27b, 28b, 29b of FIG. 2 with the brushes 27c, 28c, 29c respectively connected by conductors 48, 49, 50 respectively connected to contacts 52, 53, 54 cooperating with contact arm 55 of the selector switch 41 of the meter read-out device. As in FIG. 2, the commutator segments at the meter and at the meter read-out device corresponding to each digit are connected in parallel. The meter read-out device in the circuit diagram of FIG. 3 likewise uses the same commutator segments and brushes as in FIG. 2 and the conductors leading from the brushes to the contacts 52a, 53a, 54a cooperating with the selector switch contact arm 55a are the same and are indicated by corresponding reference numerals. There are two differences in the circuit diagram of FIG. 3. First, each of the parallel connected commutator segments at the meter and at the read-out device is connected by a separate conductor 56, 57, 58, 59, 60, 61, 62, 63, 64, 65 and the resistors 45 and 51 are omitted. The second difference is that the indicator 42, the push-button switch 43, and the battery 52c are connected in series between the selector switch arms 55, 55a. The battery 52c is still a flashlight cell. The indicator 42 is a flashlight bulb. The sensing of the digits at the meter register is done in the same way as with the FIG. 2 circuit. The knob 38, 39 or 40 at the meter read-out device associated with the order of digits to be sensed is turned until the associated brush occupies the same position on the read-out device commutator as the corresponding brush on the meter commutator. For the position illustrated in FIG. 3, this condition exists when the brush 40c at the meter read-out device rests on the commutator segment corresponding to the digit 7 which is the same digit on which the brush 29c and the meter rests. At this adjustment, a circuit is completed through the indicator 42 and the coincidence is indicated by the glowing of the indicator lamp. When the brush 40c rests on other segments, no circuit is completed through the indicator and no indication of coincidence is obtained.

To avoid ambiguity with the circuits of FIGS. 2 and 3, the drive for the meter register shafts 27, 28, 29 should move the shafts from digit to digit with a step motion so the brushes 27c, 28c, 29c do not bridge adjacent commutator segments. The step motion drive is in common use for registers.

The circuit of FIG. 3 is used in the same manner as the circuit of FIG. 2. The meter reader successively senses the position of the pointer at the needle for each order of digits and at the end of the meter reading, the position of the knobs 38, 39, 40 at the meter read-out device corresponds to the position of the pointers 27a, 28a, 29a at the meter register dials. The circuit of FIG. 3 is simpler in that the resistors 45 and 51 are omitted. The indicator 42 in FIG. 3 (the flashlight bulb) is also simpler than the null indicator (ammeter) in FIG. 2. The circuit in FIG. 3 requires thirteen conductors in the cable connecting the meter to the plug 32 for the read-out device while the circuit in FIG. 2 requires only five conductors in the cable. The additional conductors in the cable for FIG. 3 represent a minor expense and the other advantages of the circuit of FIG. 3 outweigh this minor disadvantage.

With either the circuit of FIG. 2 or the circuit of FIG. 3, the commutators at the meter and at the meter read-out device as well as the circuit interconnections between the commutator segments may conveniently be made of printed wiring board. Since the difference between the printed wiring boards required for the circuits is solely a matter of arrangement of the circuit interconnections, only the printed wiring board for the circuit of FIG. 3 will be illustrated.

The fragmentary view of FIG. 4 shows the manner of mounting the printed wiring board 66 at the meter. It is suitably supported directly under the standard water meter register plate 67 with the register shafts 27, 28, 29, projecting down through the printed wiring board. The lower ends of the shafts 28, 29 have been broken away. On the lower end of the shaft 27 is mounted an arm 68 of insulating material carrying a brush 69 having spaced contacts 70, 71 which ride on the under surface of the printed wiring board 66. As can be seen at the left of FIG. 6, the register shaft 27 is at the center of the commutator 27b and the contact 71 on the brush 69 rides on a continuous annular contact ring 72 while the contact 70 of the brush rides on the segments of the commutator 27b. The register shaft 28 is at the center of the commutator 28b and turns an arm 73 carrying a brush 74 with a contact 75 riding on the annular contact 76 and with a contact 77 riding on the commutator segments 28b. The register shaft 29 is at the center of the commutator 29b and turns an arm 78 carrying a brush 79 with a contact 80 riding on the annular contact 81 and a contact 82 riding on the commutator 29b. The printed wiring board has conductors on both sides and by tracing through the connections it can be seen that the segments of each commutator 27b, 28b, 29b of the same digit are connected in parallel and to one of the conductors 56 through 65 inclusive and that the annular contacts 68, 76, 81 are respectively connected to the conductors 48, 49, 50. The circuit connections on the printed wiring board 66 at the left of FIG. 6 correspond to the connections in the circuit at the left of FIG. 3.

The printed wiring board 83 in the meter read-out device is likewise printed on both sides of the board and on one side has the commutators 38b, 39b, 40b respectively associated with the hundreds, thousands, and ten thousands of the quantity being metered. At the center of the commutator 38b is a shaft 38c, turned by the knob 38 and having fixed thereto an arm 38d carrying a brush 38e making connection between one of the commutator segments and an annular contact 38f at the center of the commutator. At the center of the commutator 39b is a shaft 39c, turned by the knob 39 and having fixed thereto an arm 39d carrying a brush 39e making contact between one of the commutator segments and an annular contact 39f. At the center of the commutator 40b is a shaft 40c, turned by the knob 40 and having fixed thereto an arm 40d carrying a brush 40e making contact between the commutator segments and an annular contact 40f. Each of the commutators has ten segments corresponding respectively to the digits 0 to 9 inclusive and the segments for the corresponding digits are connected in parallel. The selector switch has a shaft 41a turned by knob 41 to which are fixed arms 41b, 41c respectively carrying the contact arms 55a, 55. As the shaft 41a is turned by the knob 41 to bring the contact arm 55 successively into contact with contacts 52, 53, 54, the contact arm 55a successively makes contact with contacts 52a, 53a, 54a. This makes the connections needed in order that the meter reader may set the knobs 38, 39, 40 at the meter read-out device respectively into coincidence with the position of the pointers 27a, 28a, 29a at the meter register.

Any possible ambiguity in the meter reading can be eliminated if the meter register shafts 27, 28, 29 are moved step by step with a snap action and with no dwell between steps so that the associated brushes never come to rest except on a single commutator segment. This can be done with the conventional cyclometer register drive where the register itself includes mechanism for moving the shafts from digit to digit step by step with a snap action. FIG. 7 shows a construction in which the snap action is obtained at the commutators so that the device can be used with any meter, regardless of the type of register.

FIG. 7 is a fragmentary view showing two of the commutator segments forming part of the commutator 27b associated with the meter register shaft 27. The contact 70 forming part of the brush 69 is of spring material such as berylium copper. In the position illustrated in FIG. 7, the contact 70 is riding up an incline 88 on one of the commutator segments 89 thereby compressing the contact 70 so that when it rides off the end of the segment 89 it will fall on the depressed portion 90 of the next succeeding commutator segment 91. By this arrangement, the movement of the contact 70 from segment to segment is with a snap action so that the contact never engages two segments. This prevents any ambiguity such as might occur if a contact bridged two adjacent segments. It also eliminates uncertainty which could occur if the contact did not engage either of the adjacent segments, i.e. if the contact came to rest between adjacent segments.

The construction illustrated in FIG. 7 is merely one of many mechanical arrangements for obtaining snap action movement of contacts. In general, these snap action arrangements operate on the principle that as the contact moves from one position to the next position, resistance to further movement is encountered which is stored in a spring and is subsequently released to complete the snap action movement. Having the snap action take place at the commutator segments prevents error which might arise due to malfunction of the snap action register. Also, by having the snap action take place at the commutator, the device may be used with any type of register.

In FIGS. 8–11 inclusive is shown another arrangement for preventing ambiguity due to bridging of adjacent commutator segments while the meter register is moving from one digit to the next higher digit. With this arrangement, neither the brushes nor the meter register shafts have to be moved with a snap action. The bridging of adjacent commutator segments occurs only when the meter register is moving from one digit to the next higher digit. At this condition there is no difficulty in correctly reading the meter register from the sense of the other digits. For example, the transition from 900 to 1000 on the hundreds dial 27a on the meter register would be accompanied by a transition from 0 to 1 on the thousands dial 28a. A meter reader would experience no difficulty in correctly reading the meter even though there were a slight displacement of the pointer for the thousands dial 28a. This is no more difficult than telling time where the hour hand need not be precisely synchronized with the minute hand in order to tell time correctly.

The arrangement of FIGS. 8 to 11, inclusive, is along the lines of FIGS. 3 and 6 with the following differences: (1) Each of the brushes associated with the commutator segments 27b, 28b, 29b has two contacts mechanically connected but electrically insulated from each other and spaced so that during the transition the contacts will bridge the gap between adjacent segments. (2) Instead of the three position, two pole selector switch 41 at the meter reader, the selector switch is a three position, four pole switch. (3) Three additional conductors are added to the cable 30 to take care of the three additional contacts on the brushes. This also involves the addition of an additional annular contact ring on the printed wiring board for each of the additional conductors in the cable.

The commutators 27b, 28b, 29b associated with the meter register shafts 27, 28, 29 are of the same construction as in FIGS. 3 and 6 and the segments of each commutator corresponding to the digits 0–9, inclusive, are connected in parallel with each other and respectively to the cable conductors 56–65, inclusive. Spaced between the annular contact 72 and the commutator 27b is an annular contact 92 which is connected to a cable conductor 93. Between the annular contact 75 and the segments of the commutator 28b is another annular contact 94 connected to a cable conductor 95. Between the annular contact 81 and the segments of the commutator 29b is an annular contact 96 connected to a cable conductor 97. The cable conductors 93, 95, 97 are the additional three conductors required by the dual contact brush arrangement. Except for the additional annular contacts 92, 94, 96, the printed wiring board 98 illustrated in FIG. 11 is substantially the same as the printed wiring board 66 illustrated in FIG. 6 and can be installed in the manner illustrated in FIG. 4. Additional annular contacts are similarly added to the printed wiring board 83 in the meter read-out device which need not be illustrated.

The brush construction used both at the meter and at the meter read-out device is illustrated in FIGS. 9 and 10 which specifically show the brushes associated with the meter register shaft 27. The same brush construction is used for the meter register shafts 28, 29 and for the meter read-out shafts rotated by the knobs 38, 39, 40. Fixed to the shaft 27 is an arm 99 of insulating material having on one side thereof a U-shaped metal contact 100 with one arm 101 riding on the commutator 27b and the other arm 102 riding on the inner annular contact ring 72 connected to the cable conductor 48. On the opposite side of the arm 99 is another U-shaped metal contact 103 having one arm 104 riding on the commutator 27b and having the other arm 105 riding on the annular contact ring 92 connected to the cable conductor 93. As is apparent from FIG. 10, the spacing of the contact arms 101 and 104 is such that the arms bridge adjacent commutator segments as the brush is going from one digit to the next digit. At other times, both contact arms ride on the same commutator segment.

So long as both contact arms 101 and 104 ride on the same commutator segment, no ambiguity is possible. When the four pole selector switch 106 is turned so that its contact arms 107 and 108 make contact with contacts 109 and 110 associated with commutator 27b, both contacts of the brush are connected to the indicating lamp 42. At the same time, contact arms 111 and 112 make contact with contacts 113 and 114 associated with the commutator 38b in the read-out device. Both contacts of the brush are thereby connected to the battery 52c. When the knob 38 in the read-out device is turned so that the contacts of its brush rest on the same segment as the contacts of the brush associated with the commutator 27b, a circuit is completed through the indicating lamp 41 and the push button 43 and the coincidence is indicated by the lighting of the lamp. The position of the knob 38 then indicates the position of the pointer 27a on the meter register.

The position of the pointer 28a is determined by moving the selector switch so that the contact arms 107 and 108 make contact with the contacts 115 and 116 and the contact arms 111 and 112 make contact with the contacts 117 and 118. In this position of the selector switch, the knob 39 is turned until the indicating lamp 42 flashes when the button 43 is pressed and when this happens, the position of the knob 39 indicates the position of the pointer 28a.

To determine the position of the register pointer 29a, the selector switch is turned so that its contact arms 107 and 108 make contact with contacts 119 and 120 and its contact arms 111 and 112 make contact with contacts 121 and 122. By repeating the operation, the knob 42 can be turned to a position in which the light 41 flashes, indicating the position of the meter register pointer 29a.

Because the brushes at both the meter and at the meter read-out device have two contacts insulated from each other and spaced to make contact with adjacent commutator segments at the point of transition between digits, at the transition point, the condition of coincidence will be indicated for both of the adjacent digits. When this happens, the meter reader should set the knob at the meter read-out device so that it points between two adjacent digits. Then after completing the setting of the meter read-out device to assess all three digits, the relative settings of the three knobs will remove any ambiguity.

A construction by which each of the knobs 38, 39 or 40 may be set to point either toward a separate digit or to point between two adjacent digits is illustrated in FIG. 5 where the construction is shown applied to the shaft 38c associated with the knob 38. Fixed to the shaft 38c is a radially extending spring arm 84 carrying at its outer ends diametrically opposed rollers 85 which ride in scallops 86 on a cam plate 87 on the meter read-out housing. Every other scallop 86 corresponds to one of the digits 0 to 9, inclusive, while the intermediate scallop corresponds to a position between two adjacent digits. When the knob 38 turns the shaft 38c so that it points directly to one of the digits, the brush fixed to the shaft 38 rests on only one segment of the commutator 38b. When the knob 38 is turned to point between two adjacent digits, the brush rests on two adjacent segments of the commutator 38b and connects the segments respectively to contacts 113 and 114. When the meter reader obtains an indication of coincidence with the knob 38 set on either of two adjacent segments, he sets the knob to point between the two adjacent digits and thereby indicates that at the meter register the corresponding pointer is at a point of transition to the next higher digit.

What is claimed as new is:

A remote reading system for meters having registers for indicating the flow, comprising a first multiple contact connector installed in a location accessible to a meter reader, a portable meter read-out device having a mating multiple contact connector engageable with the first connector, a ten segment commutator at the meter with each segment corresponding to a different digit, a brush on the commutator having two contacts insulated from each other and having a spacing less than the width of a commutator segment and greater than the spacing beween adjacent commutator segments, drive means from the meter for moving the brush over the commutator in correspondence with the digit indication of the meter register, a ten segment commutator at the read-out device with each segment coersponding to a different digit, a similar brush on the read-out device commutator having two contacts insulated from each other and having a spacing less than the width of a commutator segment and greater than the spacing between adjacent commutator segments, means for manually moving the brush on the read-out device commutator to a position corresponding to any digit, a multiple conductor cable with separate conductors respectively connecting each segment of the meter commutator and each contact of the brush at the meter to a different contact of the first connector, a circuit connecting each segment of the read-out device commutator and each contact of the read-out device brush to a contact of the mating multiple contact connector cooperating with the corresponding contact in the first connector, and means in said circuit for indicating coincidence of the position of each contact of the brushes on the commutators at the meter and at the read-out device.

References Cited in the file of this patent

UNITED STATES PATENTS

| | | |
|---|---|---|
| 1,244,634 | Neff | Oct. 30, 1917 |
| 2,766,446 | Bland | Oct. 9, 1956 |